(12) United States Patent
Song et al.

(10) Patent No.: US 7,746,632 B2
(45) Date of Patent: Jun. 29, 2010

(54) AIR DUCT FOR DIRECTING AIRFLOW IN A COMPUTER ENCLOSURE

(75) Inventors: Da-Wei Song, Shenzhen (CN); Pai-Yung Shih, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 298 days.

(21) Appl. No.: 11/782,658

(22) Filed: Jul. 25, 2007

(65) Prior Publication Data

US 2008/0212274 A1 Sep. 4, 2008

(30) Foreign Application Priority Data

Mar. 1, 2007 (CN) .................. 2007 2 0200111

(51) Int. Cl.
*H05K 7/20* (2006.01)
*H05K 5/00* (2006.01)

(52) U.S. Cl. .................. 361/679.49; 361/695; 361/697; 454/184

(58) Field of Classification Search .................. 361/687, 361/679.49, 694, 695; 454/184
See application file for complete search history.

(56) References Cited

U.S. PATENT DOCUMENTS

| | | | |
|---|---|---|---|
| 5,917,698 A * | 6/1999 | Viallet .................. 361/695 |
| 6,130,819 A * | 10/2000 | Lofland et al. .......... 361/695 |
| 6,309,295 B1 * | 10/2001 | Clarke et al. ............ 454/184 |
| 6,400,568 B1 * | 6/2002 | Kim et al. ............... 361/697 |
| 6,813,149 B2 * | 11/2004 | Faneuf et al. .......... 361/679.49 |
| 6,989,988 B2 * | 1/2006 | Arbogast et al. ......... 361/695 |
| 7,215,543 B2 * | 5/2007 | Arbogast et al. ......... 361/695 |
| 7,336,484 B2 * | 2/2008 | McAnally et al. ...... 361/679.41 |
| 2005/0180102 A1 * | 8/2005 | Kim ....................... 361/694 |

* cited by examiner

*Primary Examiner*—Zachary M Pape
(74) *Attorney, Agent, or Firm*—Frank R. Niranjan

(57) ABSTRACT

An air duct (10) is used for directing air in a computer enclosure (50) to flow from an interior to an exterior thereof for dissipating heat generated from an electronic device (82) in the computer enclosure. At least one cable is provided in the computer enclosure for power supply or data transmission. The air duct includes a top wall (11), a pair of side walls (13), and at least one retaining member. The side walls depend from opposite ends of the top wall. At least one retaining member is formed on at least one of the top wall and one of the side walls for retaining the at least one cable therein. The at least one retaining member and the at least one of the top wall and the side walls cooperatively form a retaining space therebetween.

8 Claims, 4 Drawing Sheets

AIR DUCT FOR DIRECTING AIRFLOW IN A COMPUTER ENCLOSURE

BACKGROUND

1. Field of the Invention

The present invention relates to an air duct for directing airflow, and particularly to an air duct for facilitating a layout of cables in a computer enclosure.

2. Description of Related Art

Nowadays, more and more cables, such as power supply cables or signal cables, are needed in a computer enclosure for data and electrical signal transmission due to additional devices being added as a result of advances in computer technology. Such cables are arranged along any convenient pathway in the enclosure for connecting a plurality of different electronic units.

Further, more heat is produced in the computer enclosure from the additional devices. A fan and a plurality of thermal fins are normally used for dissipation of heat with the enclosures, but the arrangement of cables within the computer does not take into account interference it may cause to the effectiveness of the fan and the thermal fins.

What is needed, therefore, is an air duct for directing airflow from a fan, most effectively for taking heat away from an electronic device, while also facilitating a convenient layout of cables within a computer enclosure.

SUMMARY

An air duct is used for directing air in a computer enclosure to flow from an interior to an exterior thereof for dissipating heat generated from an electronic device in the computer enclosure. At least one cable is provided in the computer enclosure for power supply or data transmission. The air duct includes a top wall, a pair of side walls, and at least one retaining member. The side walls depend from opposite ends of the top wall. At least one retaining member is formed on at least one of the top wall and one of the side walls for retaining the at least one cable therein. The at least one retaining member and the at least one of the top wall and the side walls cooperatively form a retaining space therebetween.

Other advantages and novel features of the present invention will become more apparent from the following detailed description of a preferred embodiment when taken in conjunction with the accompanying drawings, in which:

DETAILED DESCRIPTION OF THE EMBODIMENT

Figure 1:
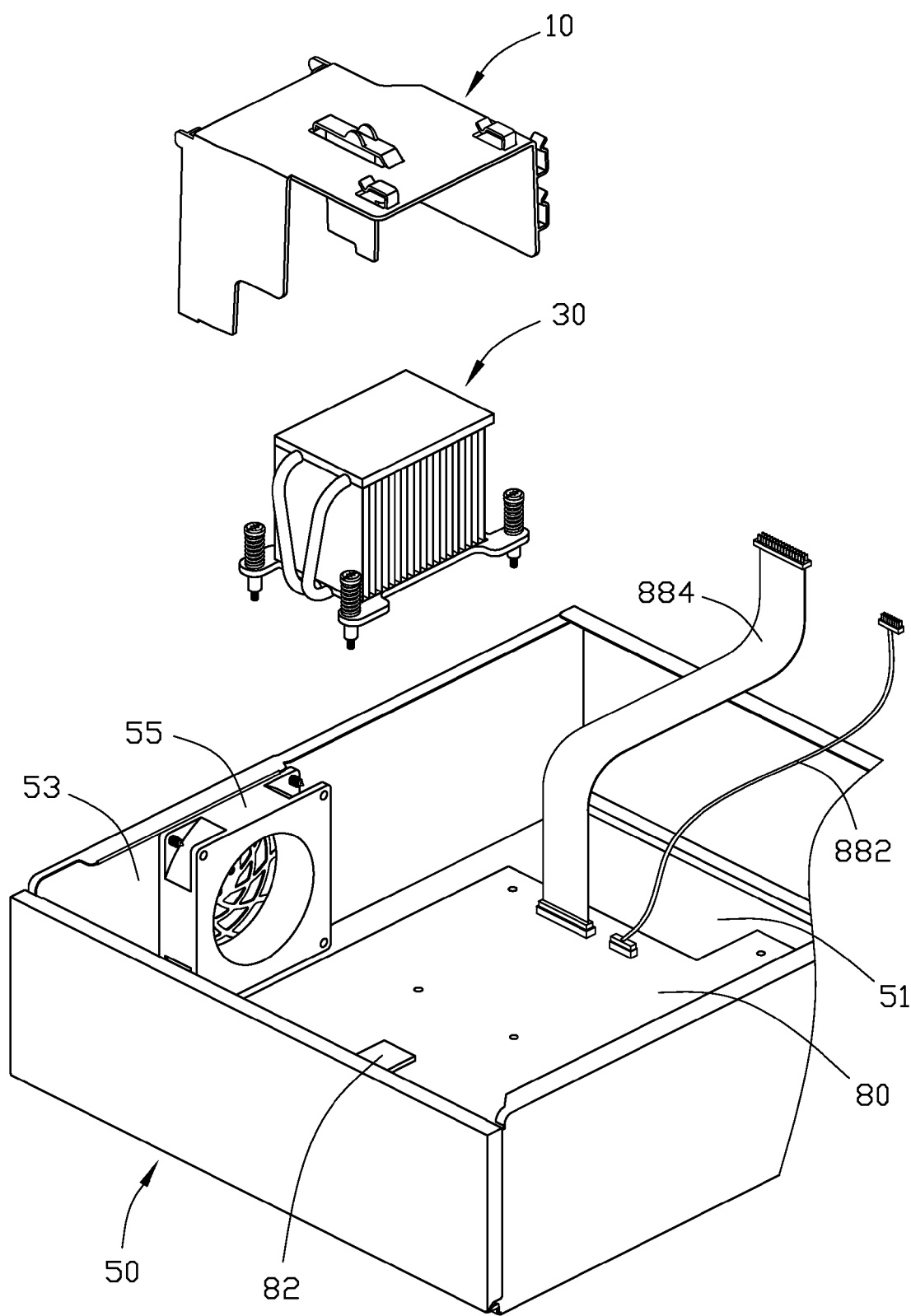
FIG. 1 is a partially exploded, isometric view of computer according to a preferred embodiment of the present invention, the computer comprising an enclosure, a motherboard, a fan, a heat dissipating device, and an air duct.

Referring to FIG. 1, a computer including an enclosure 50, a motherboard 80 positioned on a bottom panel 51 of the enclosure 50, a fan 55 attached to a side panel 53 of the enclosure 50, a heat dissipating device 30 attached to the motherboard 80, and an air duct 10 for directing an airflow generated from the fan 55 is shown.

The mother board 80 includes a heat generating electronic element 82, such as CPU (central processing unit), attached thereon. Two cables are connected to the motherboard 80 for respectively supplying power and transmitting data signals. One cable 882 is nearly circular in cross section, and another cable 884 is flat.

Figure 2:
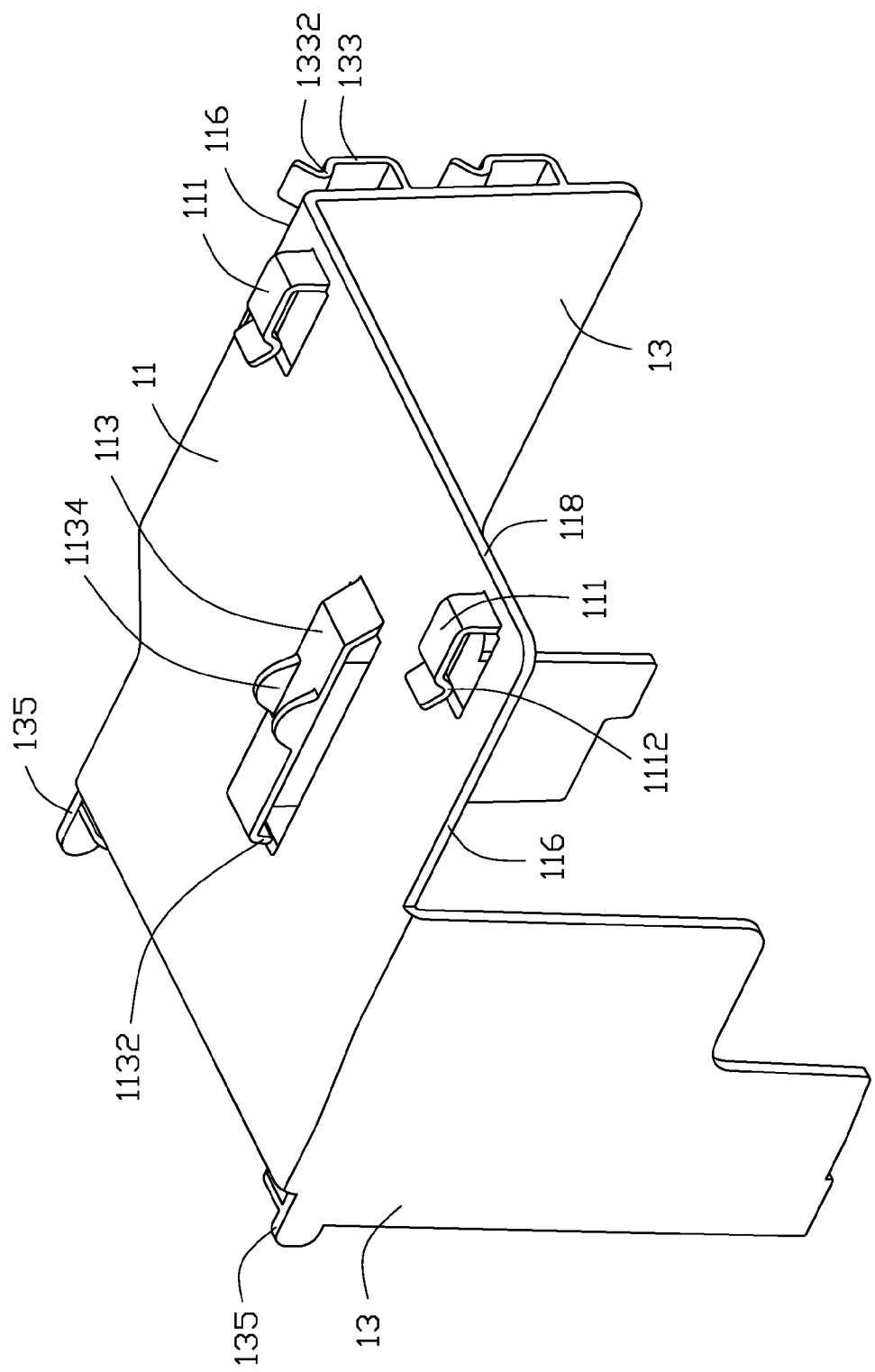
FIG. 2 is an enlarged, isometric view of the air duct of FIG. 1.
Figure 3:
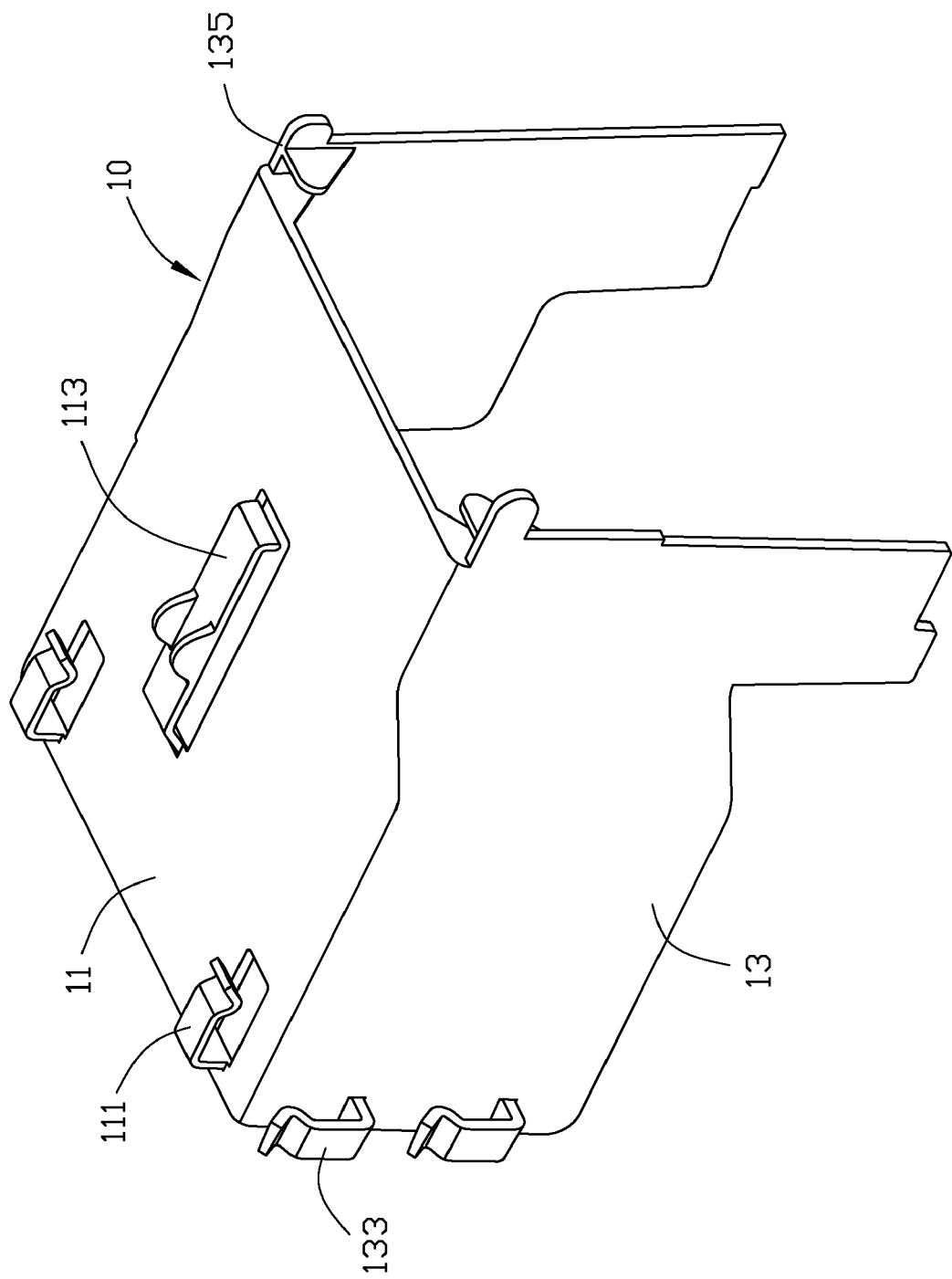
FIG. 3 is similar to FIG. 2, but shown from another aspect.

Referring also to FIG. 2 and FIG. 3, the air duct 10 includes a top wall 11, and a pair of side walls 13 perpendicularly extending from two opposite sides of the top wall 11 respectively. A hook 113 and two hooks 111 are formed on an outer surface of the top wall 11. An extending direction of the hook 113 and the hooks 111 is parallel to the side walls 13. A space is formed between each hook 113, 111 and the top wall 11. The hook 113 has a holding portion 1132 extending down towards the top wall 11 at a distal end thereof. A pair of flanges 1134 is formed on a top surface of the hook 113 for abutting on a top cover 60 (see FIG. 4). A V-shaped holding portion 1112 is formed on the hook 111. Two hooks 133 are formed on one side wall 13 with each extending direction perpendicular to the plane of the top wall 11. Each hook 133 has a retaining space and a V-shaped holding portion 1332. A pair of locking members 135 is formed on back side of the side walls 13 for locking the air duct 10 to the fan 55.

Figure 4:
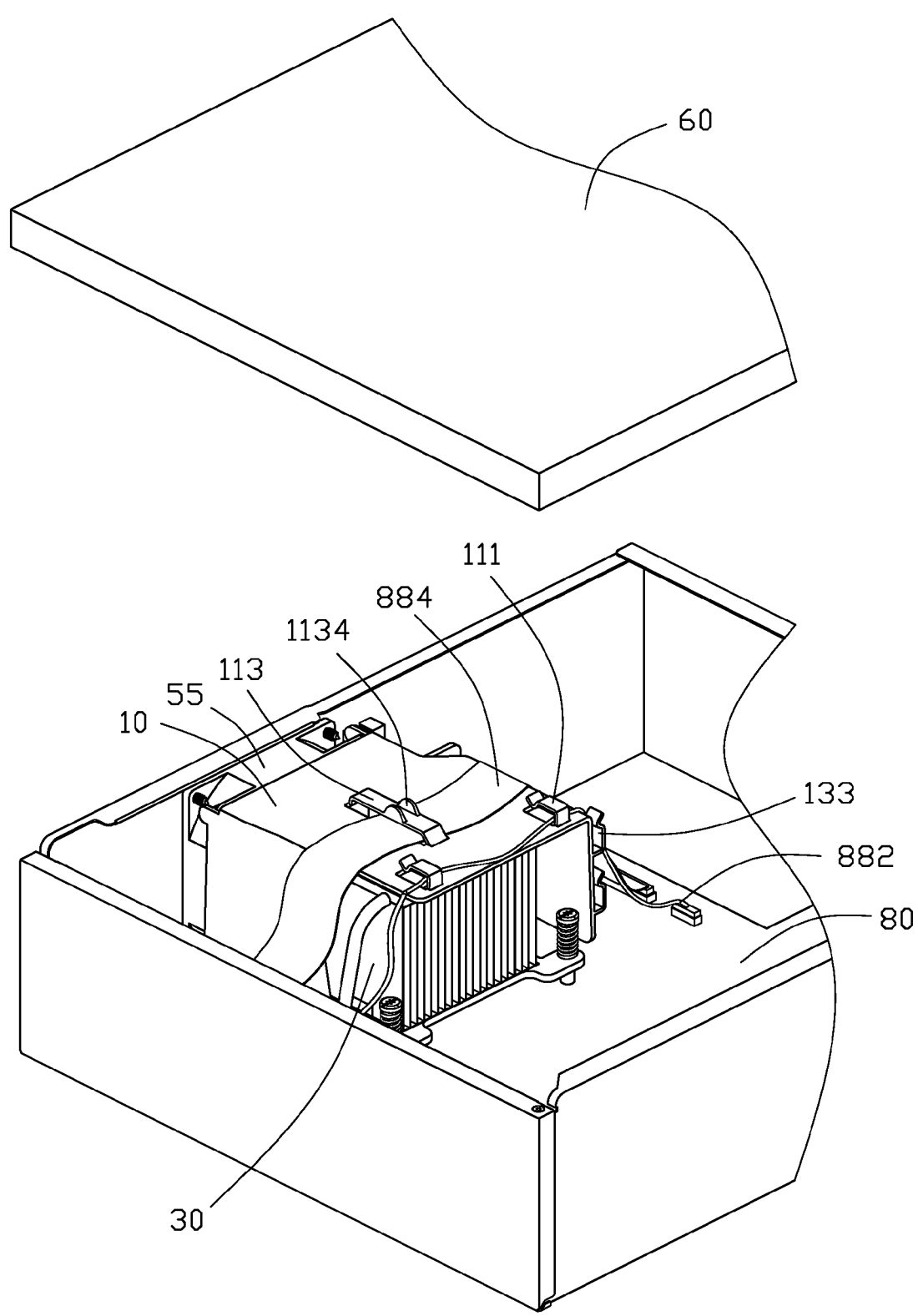
FIG. 4 is a partially, assembled view of FIG. 1.

Referring also to FIG. 4, when assembling the computer, the heat dissipating device 30 is attached to the heat generating electronic element 82 with the fan 55 positioned on one side thereof. The air duct 10 is fit to the enclosure 50 with the heat dissipating device 30 received therein and the locking member 135 engaging with the fan 55. The cable 884 is retained in the hook 113 of the air duct 10. The cable 882 is retained in the hooks 111 or the hook 113 as needed. Finally, the cover 60 is attached to a top portion of the enclosure 50. The cover 60 abuts on the flange 1134 of the hook 113 for preventing the cable 884 accidentally releasing therefrom. Thus the cables 882, 884 are conveniently arranged and do not interfere with heat dissipation in the computer.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An air duct for directing air in a computer enclosure to flow from an interior to an exterior thereof for dissipating heat generated from an electronic device in the computer enclosure, at least one cable being provided in the computer enclosure for power supply or data transmission, the air duct comprising:

a top wall, a pair of side walls depending from opposite ends of the top wall, and at least one retaining member formed on at least one of the top wall and the side walls for retaining the at least one cable therein, the at least one retaining member and the at least one of the top wall and the side walls cooperatively forming a retaining space therebetween;

wherein the at least one retaining member is formed on the top wall, and an extending direction of the at least one retaining member is substantially parallel to the side walls of the air duct, at least one flange is formed on the at least one retaining member, so that the at least one retaining member can be urged by a top cover of the computer for preventing the at least one cable from being accidentally released therefrom.

2. The air duct as described in claim 1, wherein the at least one retaining member is at least one hook, and the at least one hook has a holding portion formed at a free end thereof.

3. The air duct as described in claim 1, wherein the at least one retaining member is formed on one of the side walls with each free end of the at least one retaining member extending towards the top wall.

4. A computer comprising: a motherboard, the motherboard comprising a heat generating electronic element; at least one cable with one end connected to the motherboard; a heat dissipating device attached to the heat generating electronic element; an air duct for guiding an airflow through the heat dissipating device, the air duct comprising a top wall, and a pair of side walls extending from opposite ends of the top wall, two first retaining members and a second retaining member formed on the top wall for retaining the at least one cable therein, extending directions of the first retaining members and the second retaining member being substantially parallel to the side walls, the first retaining members being aligned with each other for collecting the cable therethrough, each first retaining member having a V-shaped holding portion, the second retaining member having a holding portion extending down towards the top wall at a distal end thereof for blocking the at least one cable from running out of the second retaining member; and a top cover, wherein at least one flange is formed on the second retaining member, the at least one flange of the second retaining member being urged by the top cover of the computer.

5. The computer as described in claim 4, wherein the at least one cable comprises at least one flat cable and at least one round cable, and the first retaining member is configured for retaining the flat cable and the second retaining member is configured for retaining the round cable.

6. The computer as described in claim 4, wherein a third retaining member is formed on one of the side walls with each free end of the third retaining member extending towards the top wall.

7. A computer comprising: a motherboard comprising a heat generating electronic element; at least one cable connected with the motherboard; a heat dissipating module mounted on the heat generating electronic element; an enclosure including a bottom plate with the motherboard mounted thereon, a top cover facing toward the bottom plate, and a side plate extending from the bottom plate to the top plate, the side plate having a fan mounted thereon, the fan being disposed proximate to the heat dissipating module; and an air duct arranged on the mother board, the air duct having a top wall, a pair of side walls depending from opposite ends of the top wall, and a pair of locking members formed near one end of the side walls for locking the fan therebetween, the air duct and the mother board cooperatively forming an airflow channel receiving the heat dissipating module therein, wherein the air duct comprises at least one retaining member for causing the at least one cable to be attached thereto, wherein the at least one retaining member is formed on the top wall of the air duct and elastically abutting against an inner surface of the top cover.

8. The computer as described in claim 7, wherein the fan is configured for directing an air in the enclosure to flow from an interior to an exterior thereof.

* * * * *